United States Patent
Nakayama et al.

(10) Patent No.: US 11,425,198 B2
(45) Date of Patent: Aug. 23, 2022

(54) COMMUNICATION SYSTEM FOR AIR CONDITIONER, AND AIR CONDITIONER

(71) Applicant: DAIKIN INDUSTRIES, LTD., Osaka (JP)

(72) Inventors: Yoshimasa Nakayama, Osaka (JP); Ryousuke Yamamoto, Osaka (JP); Shinichi Ishizeki, Osaka (JP); Kunitaka Morimoto, Osaka (JP); Munehiko Fujimoto, Osaka (JP); Yuuki Ogiso, Osaka (JP); Atsushi Tokunaga, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/051,050

(22) PCT Filed: May 15, 2019

(86) PCT No.: PCT/JP2019/019286
§ 371 (c)(1),
(2) Date: Oct. 27, 2020

(87) PCT Pub. No.: WO2020/012773
PCT Pub. Date: Jan. 16, 2020

(65) Prior Publication Data
US 2021/0092189 A1     Mar. 25, 2021

(30) Foreign Application Priority Data
Jul. 12, 2018   (JP) .............................. JP2018-132034

(51) Int. Cl.
*H04L 67/12*     (2022.01)
*H04B 3/02*      (2006.01)
(Continued)

(52) U.S. Cl.
CPC .............. *H04L 67/12* (2013.01); *G08C 17/02* (2013.01); *H04B 1/38* (2013.01); *H04B 3/02* (2013.01);
(Continued)

(58) Field of Classification Search
CPC ........ H04L 67/12; H04L 69/08; H04W 76/10; H04B 3/02; H04B 1/38; G08C 2201/12;
(Continued)

(56) References Cited

U.S. PATENT DOCUMENTS

2004/0010347 A1    1/2004   Yamanashi et al.
2005/0264474 A1*  12/2005   Rast ..................... G09G 3/14
                                                    345/55

(Continued)

FOREIGN PATENT DOCUMENTS

CN    204693661 U    10/2015
CN    205245392 U     5/2016
(Continued)

OTHER PUBLICATIONS

Suzuki Tatsumichi Electric Cleaner 2015 (Year: 2015).*
(Continued)

*Primary Examiner* — Omar J Ghowrwal
(74) *Attorney, Agent, or Firm* — Birch, Stewart, Kolasch & Birch, LLP

(57) ABSTRACT

Provided is a communication system for an air conditioner including a housing and a control board accommodated in the housing. The communication system includes: a communication conversion unit accommodated in the housing and configured to acquire a required electric signal from the control board and to convert the electric signal into a digital signal for wire transmission; a cable having a first end connected to the communication conversion unit, the cable being drawn out of the housing to outside; and an antenna
(Continued)

unit connected to a second end of the cable located outside the housing, the antenna unit being configured to establish wireless communication with a base station.

11 Claims, 3 Drawing Sheets

(51) Int. Cl.
*H04W 76/10* (2018.01)
*G08C 17/02* (2006.01)
*H04B 1/38* (2015.01)
*H04L 69/08* (2022.01)
*F24F 1/22* (2011.01)
*F24F 11/58* (2018.01)

(52) U.S. Cl.
CPC ............ *H04L 69/08* (2013.01); *H04W 76/10* (2018.02); *F24F 1/22* (2013.01); *F24F 11/58* (2018.01); *G08C 2201/12* (2013.01); *G08C 2201/40* (2013.01)

(58) Field of Classification Search
CPC ....... G08C 2201/40; G08C 17/02; F24F 1/22; F24F 11/58
USPC ........................................................ 370/329
See application file for complete search history.

(56) References Cited

U.S. PATENT DOCUMENTS

| | | | | |
|---|---|---|---|---|
| 2010/0308119 | A1* | 12/2010 | Steinberg | G05D 23/1904 236/51 |
| 2016/0169713 | A1 | 6/2016 | Graff et al. | |
| 2017/0248329 | A1 | 8/2017 | Inada et al. | |
| 2018/0054231 | A1* | 2/2018 | Malach | H04B 1/48 |
| 2018/0100664 | A1 | 4/2018 | Keogh | |
| 2018/0180797 | A1 | 6/2018 | Matsumoto | |
| 2018/0204819 | A1 | 7/2018 | Naruse | |
| 2018/0288093 | A1* | 10/2018 | Kato | H04L 67/2871 |
| 2019/0049138 | A1 | 2/2019 | Matsumoto et al. | |
| 2020/0025403 | A1 | 1/2020 | Oumi et al. | |

FOREIGN PATENT DOCUMENTS

| | | |
|---|---|---|
| CN | 205452520 U | 8/2016 |
| CN | 207338278 U | 5/2018 |
| EP | 3 002 522 A2 | 4/2016 |
| JP | 48-79300 U | 9/1973 |
| JP | 54-72678 U | 5/1979 |
| JP | 7-31048 A | 1/1995 |
| JP | 10-185649 A | 7/1998 |
| JP | 2002-13761 A | 1/2002 |
| JP | 2004-28384 A | 1/2004 |
| JP | 2005-277987 A | 10/2005 |
| JP | 3903345 B2 | 4/2007 |
| JP | 2010-139158 A | 6/2010 |
| JP | 2011-180668 A | 9/2011 |
| JP | 2014-127014 A | 7/2014 |
| JP | 5708517 B2 | 4/2015 |
| JP | 2015-124939 A | 7/2015 |
| JP | 2016-220151 A | 12/2016 |
| JP | 2017-156080 A | 9/2017 |
| JP | 2017-192021 A | 10/2017 |
| JP | 2018-59706 A | 4/2018 |
| JP | 6325103 B2 | 4/2018 |
| JP | 2018-106067 A | 7/2018 |
| JP | 6378997 B2 | 8/2018 |
| KR | 20080079484 A * | 9/2008 |
| WO | WO 2016/080352 A1 | 5/2016 |
| WO | WO 2016/117371 A1 | 7/2016 |
| WO | WO 2016/208223 A1 | 12/2016 |
| WO | WO-2016208223 A1 * | 12/2016 ............... F24F 1/22 |
| WO | WO 2017/038904 A1 | 3/2017 |
| WO | WO 2018/056436 A1 | 3/2018 |

OTHER PUBLICATIONS

Liu Ying "Air condensing units and air conditioning unit" 2015 (Year: 2015).*
Zhang Tingting "Wireless transmission magnetic adsorption type temperature vibration transmitter" (Year: 2016).*
English Translation of KR 20080079484 A, Sep. 1, 2008, Retrieved from PE2E-SEARCH on Jan. 14, 2022. (Year: 2008).*
English translation of the Written Opinion of the International Searching Authority for International Application No. PCT/JP2019/019286, dated Jul. 30, 2019.
International Search Report, issued in PCT/JP2019/019286, PCT/ISA/210, dated Jul. 30, 2019.
"About efforts to create new value related to air utilizing LPWA," Daikin Industries, Ltd., Nov. 15, 2016 (accessed online Oct. 7, 2020), pp. 1-4, Retrieved from: https://www.nttwest.co.jp/news/1611/161115a.html.
"Air-Conditioning Making Smart," Mitsubishi Heavy Industries air conditioning synthesis management system catalog, Feb. 2018, pp. 1-40.
"Maintenance," Panasonic, Panasonic Industrial Machinery Systems Co., Ltd., pp. 1-6, accessed online Nov. 12, 2020, Retrieved from: https://Panasonic.co.jp/ap/pces/service/.
"Started providing "M-ACCESS", a service for centrally managing air-conditioning equipment with IoT," Mitsubishi Heavy Industries Group, No. 5902, Nov. 21, 2017 (accessed online Sep. 10, 2020), pp. 1-3, Retrieved from: https://www.mhi.com/jp/news / 1711215902.html.
Notice of Reasons for Revocation of Japanese Patent No. 6721008 (Japanese Application No. 2018-132034) with Japanese Appiication No. 2020-700928 in opposition, dated Apr. 7, 2021, with English translation.
Panasonic business use air-conditioning equipment remote supervisory system Sun-S network Catalog, Apr. 2015, pp. 1-4.
Written Opposition to counterpart Japanese Application No. 2018-132034, dated Dec. 8, 2020, with English translation.
Written Opposition to counterpart Japanese Application No. 2018-132034, dated Nov. 30, 2020, with English translation.
Extended European Search Report dated Jul. 28, 2021 in corresponding European Application No. 19833292.6.
General Catalog of Multi Air Conditioners for DAIKIN Buildings Published Sep. 2017 pp. 261-269.
Opinion dated Feb. 2, 2022 issued in counterpart Japanese Patent Application No. 2018-132034 with English Translation.
Panasonic Building Multi Air Conditioner General Catalog 2017 Published Nov. 2017 pp. 167-168.
Panasonic Remote monitoring adapter CZ 01AP60B Specification.

* cited by examiner

COMMUNICATION SYSTEM FOR AIR CONDITIONER, AND AIR CONDITIONER

TECHNICAL FIELD

The present disclosure relates to communications mainly for an air conditioner for industrial use.

BACKGROUND ART

There are various air conditioners such as simple air conditioners for home use and large air conditioners for industrial use. An air conditioner manufacturer offers service of surveillance and maintenance of particularly air conditioners for industrial use. For example, there has been proposed a technique of reading information in a contactless manner by bringing an information terminal close to a transceiver in an outdoor unit of an air conditioner, the transceiver being configured to provide information on the outdoor unit for, for example, maintenance inspection or repair of the air conditioner (refer to, for example, Patent Literature 1).

With a recent quantum leap in Internet-related technology, the Internet of Things (IoT) that enables remote control and operation on an apparatus of interest over the Internet has been taken into consideration in the various fields including air conditioners. For example, an outdoor unit of an air conditioner includes a communication unit configured to establish wireless communication with a base station. An air conditioner manufacturer is thus able to collect information on the air conditioner, using a server connected to the base station over the Internet, and is also able to operate the air conditioner at a remote site.

CITATION LIST

Patent Literature

Patent Literature 1: WO 2016/080352 A1

SUMMARY OF INVENTION

Technical Problem

In a typical air conditioner, a housing of an outdoor unit is made of a metal such as iron. The metal housing hinders radio waves from reaching a communication unit disposed in the outdoor unit.

In view of the circumstance described above, the present disclosure provides a communication system for an air conditioner, the communication system being easy to install and establishing communication without any trouble, and an air conditioner in the communication system.

Solution to Problem (1) The present disclosure provides a communication system for an air conditioner including a housing and a control board accommodated in the housing. The communication system includes a communication conversion unit accommodated in the housing and configured to acquire a required electric signal from the control board and to convert the electric signal into a digital signal for wire transmission. The communication system also includes a cable having a first end connected to the communication conversion unit, the cable being drawn out of the housing to outside. The communication system also includes an antenna unit connected to a second end of the cable located outside the housing, the antenna unit being configured to establish wireless communication with a base station.

With this configuration, the communication system is easy to install, and establishes communication without any trouble.

(2) In the communication system as recited in (1), for example, communication between the antenna unit and the base station is established by a low power wide area (LPWA) communication method, and communication using the cable is established by a digital communication different from the LPWA communication method.

According to the LPWA communication method, a volume of data to be transmitted at a time is small. However, data is transmittable with lower power consumption and at lower cost. In addition, the LPWA communication method achieves a far longer communication range than WI-FI and BLUETOOTH. Adopting the LPWA communication method such as SIGFOX enables long-range communication between the antenna unit and the base station with reduced power consumption and at reduced cost. The communication using the cable is established by, for example, alternate mark inversion (AMI) which is an encoded digital communication method less susceptible to an influence of surge noise. This configuration therefore suppresses an influence of surge noise.

(3) In the communication system as recited in (1) or (2), preferably, the communication conversion unit is disposed in proximity to the control board in the housing.

With this configuration, reducing the distance between the communication conversion unit and the control board enables suppression of surge noise. In addition, a control power voltage is gained from the control board using a shorter connecting wire.

(4) In the communication system as recited in (2), for example, the antenna unit includes a communication conversion unit configured to convert the digital signal into a communication signal for the LPWA communication method.

With this configuration, the communication conversion unit generates the communication signal for the LPWA communication method, in the immediate vicinity of an antenna. This configuration therefore suppresses an influence of surge noise more effectively.

(5) In the communication system as recited in any of (1) to (4), the digital signal may be a signal superimposed on a power voltage for the antenna unit.

This configuration eliminates a necessity of a power supply dedicated to the antenna unit.

(6) In the communication system as recited in any of (1) to (5), the cable may be a two-wire vinyl cabtyre cable.

A two-wire vinyl cabtyre cable is available with ease, and requires no dedicated connector at its end. In addition, the two-wire vinyl cabtyre cable is inexpensive as a whole, and is excellent in weather resistance.

(7) In the communication system as recited in any of (1) to (6), the antenna unit may include a magnet for magnetic adsorption.

With this configuration, the antenna unit is fixable to any position of an iron plate with ease at a place where the antenna unit is capable of wireless communication with the base station. For example, the antenna unit may be fixed to an outer surface of the housing of the air conditioner (i.e., the outdoor unit). This configuration therefore requires no construction such as boring, and also requires no waterproof treatment associated with boring. This configuration thus enables rapid installation of the communication system.

(8) The present disclosure also provides an air conditioner including: a housing; a control board accommodated in the housing; a communication conversion unit accommodated in the housing and configured to acquire a required electric signal from the control board and to convert the electric signal into a digital signal for wire transmission; a cable having a first end connected to the communication conversion unit, the cable being drawn out of the housing to outside; and an antenna unit connected to a second end of the cable located outside the housing, the antenna unit being configured to establish wireless communication with a base station.

With this configuration, the air conditioner including the communication conversion unit and the antenna unit is easy to install, and establishes communication without any trouble.

DESCRIPTION OF EMBODIMENTS

Figure 1:
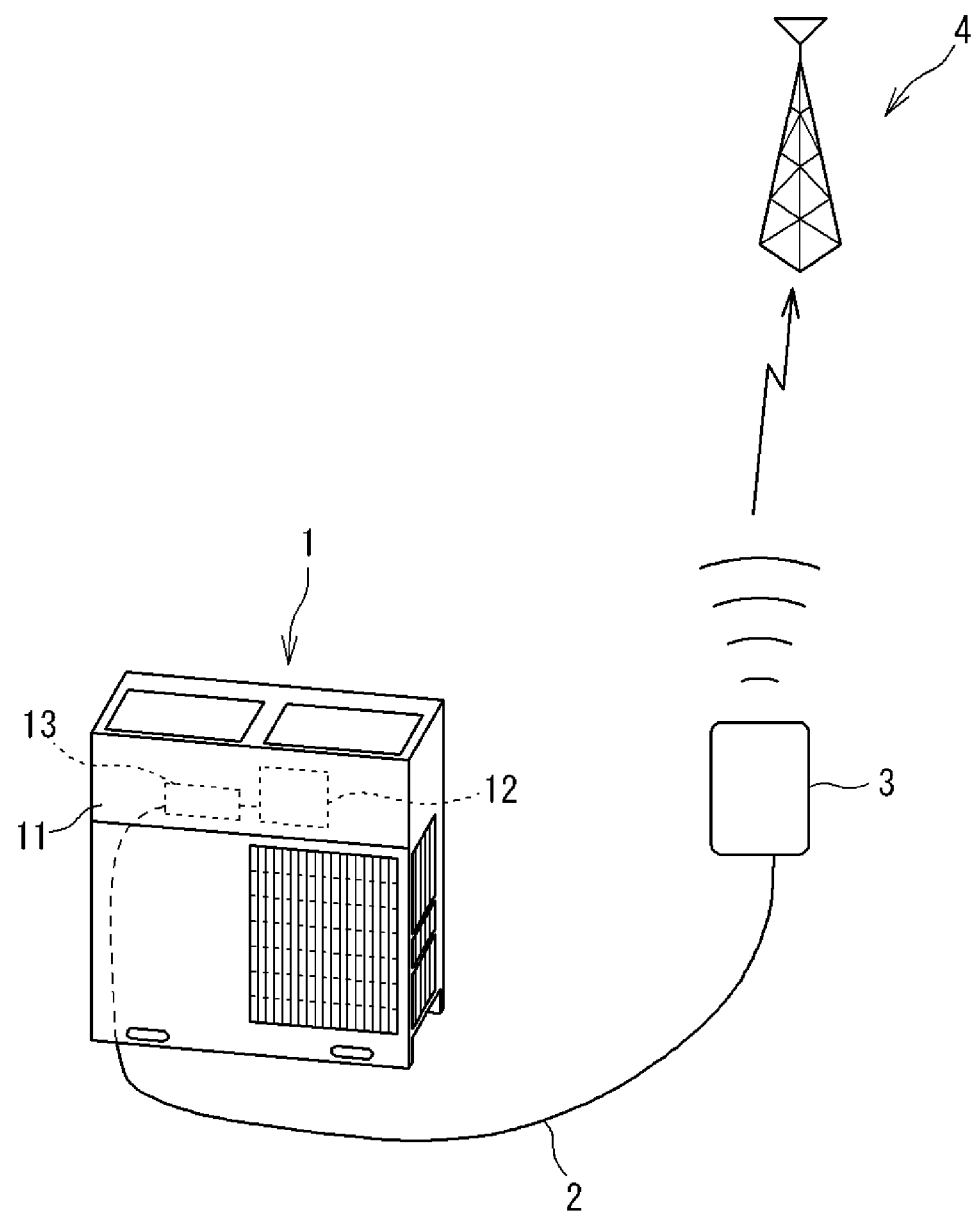
FIG. 1 is a diagram of a communication system for an air conditioner according to an embodiment.

FIG. 1 is a diagram of a communication system for an air conditioner according to an embodiment. The following description mainly concerns a configuration and functions of a communication system for an air conditioner. The structure and functions inherent in an air conditioner for air conditioning will not be described here.

FIG. 1 illustrates constituent elements of the communication system depicted for making the presence of each element evident; therefore, the dimensions of each component are different from actual ones.

As illustrated in FIG. 1, an air conditioner (i.e., an outdoor unit) 1 includes a housing 11 made of a metal such as iron. The air conditioner 1 also includes a control board 12 and a communication conversion unit 13 disposed beside the control board 12. The housing 11 accommodates therein the control board 12 and the communication conversion unit 13. A cable 2 is connected at its first end to the communication conversion unit 13. The cable 2 is drawn out of the housing 11 from, for example, a lower side of the housing 11 to outside. The cable 2 is, for example, a two-wire vinyl cabtyre cable (VCT).

A two-wire vinyl cabtyre cable is available with ease and requires, at its end, no dedicated connector such as an F-type plug of a coaxial cable. The two-wire vinyl cabtyre cable is therefore inexpensive as a whole. The two-wire vinyl cabtyre cable is also excellent in weather resistance, and is therefore suitable for outdoor use. The cable 2 is also connected at its second end (an upper right end in FIG. 1) to an antenna unit 3.

The cable 2 is not an accessory of the air conditioner 1 or the antenna unit 3, but is a product to be procured at the site of installation. Therefore, the length of the cable 2 is not fixed. The antenna unit 3 is installed near the air conditioner 1 at a place suitable for communication with a base station 4. In addition, the cable 2 of appropriate length is prepared for connecting the communication conversion unit 13 to the antenna unit 3. The cable 2 may have a length up to, for example, about 30 m. As long as communication is favorably established with good sensitivity even at the place where the air conditioner 1 is installed, the antenna unit 3 may be mounted to an outer surface of the housing 11 of the air conditioner 1.

The antenna unit 3 is, for example, a communication device for SIGFOX, and is capable of wireless communication with the base station 4 in the sub-GHz band (920 MHz in Japan, 868 MHz in Europe, 915 MHz in North America). The communication speed is, for example, about 100 bps. The base station 4 is a base station for SIGFOX. A maximum value of a distance from the antenna unit 3 to the base station 4, that is, a maximum propagation distance is, for example, about 50 km.

Figure 2:
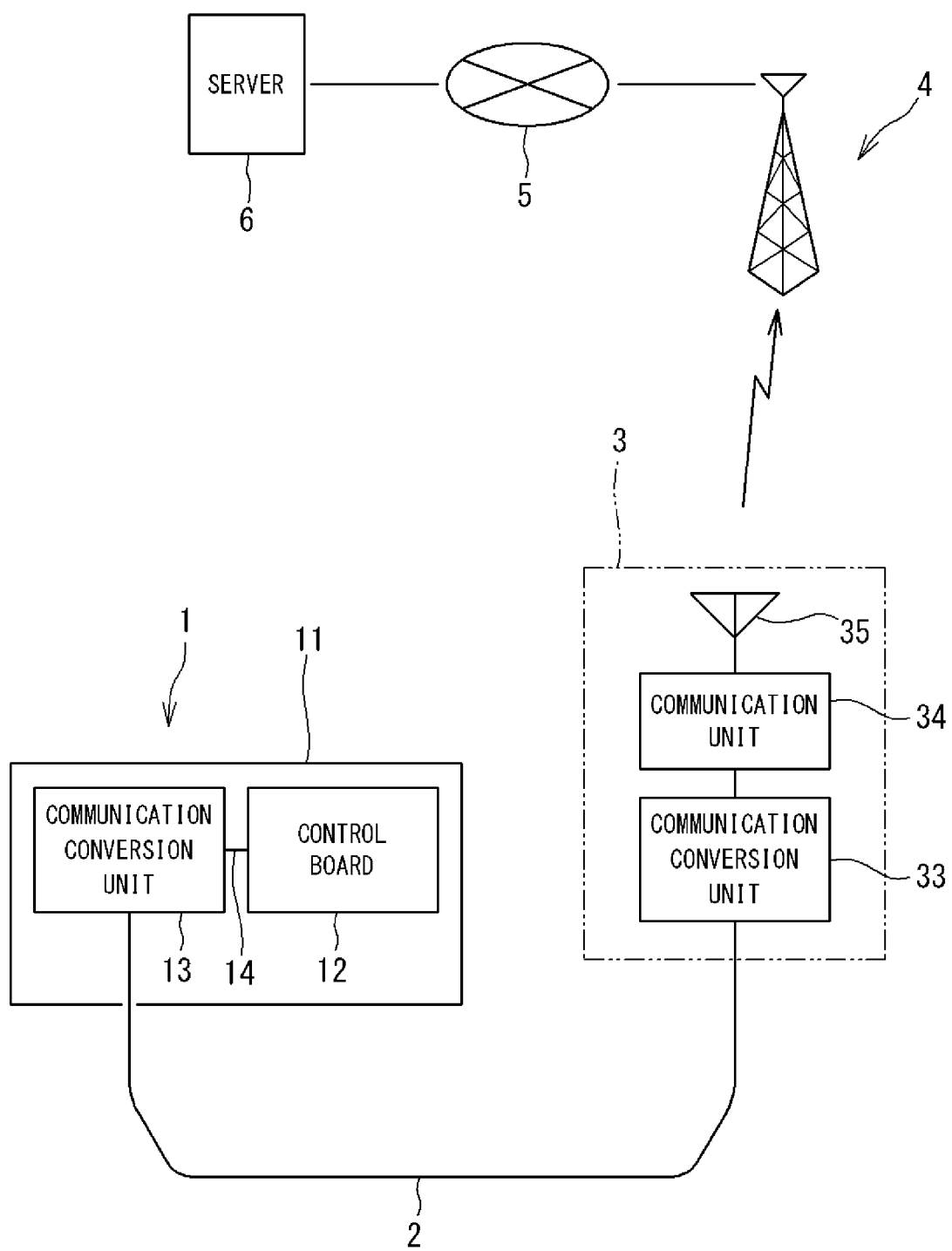
FIG. 2 is an electrical block diagram of the communication system illustrated in FIG. 1, which also illustrates a connection over the Internet.

FIG. 2 is an electrical block diagram of the communication system illustrated in FIG. 1, which also illustrates a connection over the Internet. As illustrated in FIG. 2, the control board 12 is connected to the communication conversion unit 13 in the housing 11 of the air conditioner (i.e., the outdoor unit) 1. The communication conversion unit 13 is disposed in proximity to the control board 12 such that an electric circuit 14 between the communication conversion unit 13 and the control board 12 is as short as possible. Reducing the distance between the communication conversion unit 13 and the control board 12 enables suppression of surge noise. In addition, a control power voltage (Vcc) is gained from the control board 12 using a short connecting wire.

The communication conversion unit 13 acquires various kinds of information from the control board 12 in the form of electric signals. The communication conversion unit 13 converts the electric signals into encoded digital signals by, for example, alternate mark inversion (AMI). AMI is a method of transmitting a digital signal by half-duplex communication. According to AMI, a signal is transmitted by applying a signal voltage excluding a direct current component and taking zero, a positive value or a negative value across the two wires of the cable 2 serving as a transmission line. A control power voltage (Vcc: e.g., DC 16 V) for the air conditioner 1 is applied as a reference voltage across the two wires of the cable 2. The signal transmission is made in such a manner that a signal voltage corresponding to a code of a signal for AMI is superimposed on the control power voltage.

The communication using the cable 2 is established by AMI which is an encoded digital communication method less susceptible to an influence of surge noise. This configuration therefore suppresses an influence of surge noise. The cable 2 is an antenna line configured to carry a digital signal for wire transmission rather than a signal for wireless transmission, and is therefore less susceptible to an influence of surge noise.

The cable 2 is also capable of feeding a power voltage to the antenna unit 3. This configuration therefore eliminates a necessity of a power supply dedicated to the antenna unit 3.

The communication conversion unit 33 of the antenna unit 3 is configured to convert a signal for AMI into a signal for SIGFOX. The signal for SIGFOX thus obtained by conversion is radiated at a radio frequency of, for example, 920 MHz from a communication unit 34 and an antenna 35 of the communication unit 34. In the antenna unit 3, the communication conversion unit 33 generates a communication signal for SIGFOX, in the immediate vicinity of the antenna 35. This configuration therefore suppresses an influence of surge noise more effectively.

The base station 4 receives the radio waves from the antenna unit 3. The LPWA communication method such as SIGFOX enables the antenna unit 3 to communicate with the base station 4 with low power consumption and at low cost.

Upon reception of the radio waves, the base station 4 sends the information on the air conditioner 1 to the server 6 over the Internet 5. In practice, the base station 4 receives radio waves from a plurality of (a number of) air conditioners 1, and sends information on each air conditioner to the server 6. This system achieves remote control of multiple air conditioners, using the server 6.

Since only the upstream communication is currently authorized as to SIGFOX, FIG. 2 illustrates signal transmission from the air conditioner 1 to the server 6. However, if the communication system is designed to achieve bidirectional signal transmission, then the communication system achieves downstream communication from the server 6 to air conditioner 1 with ease.

Figure 3:
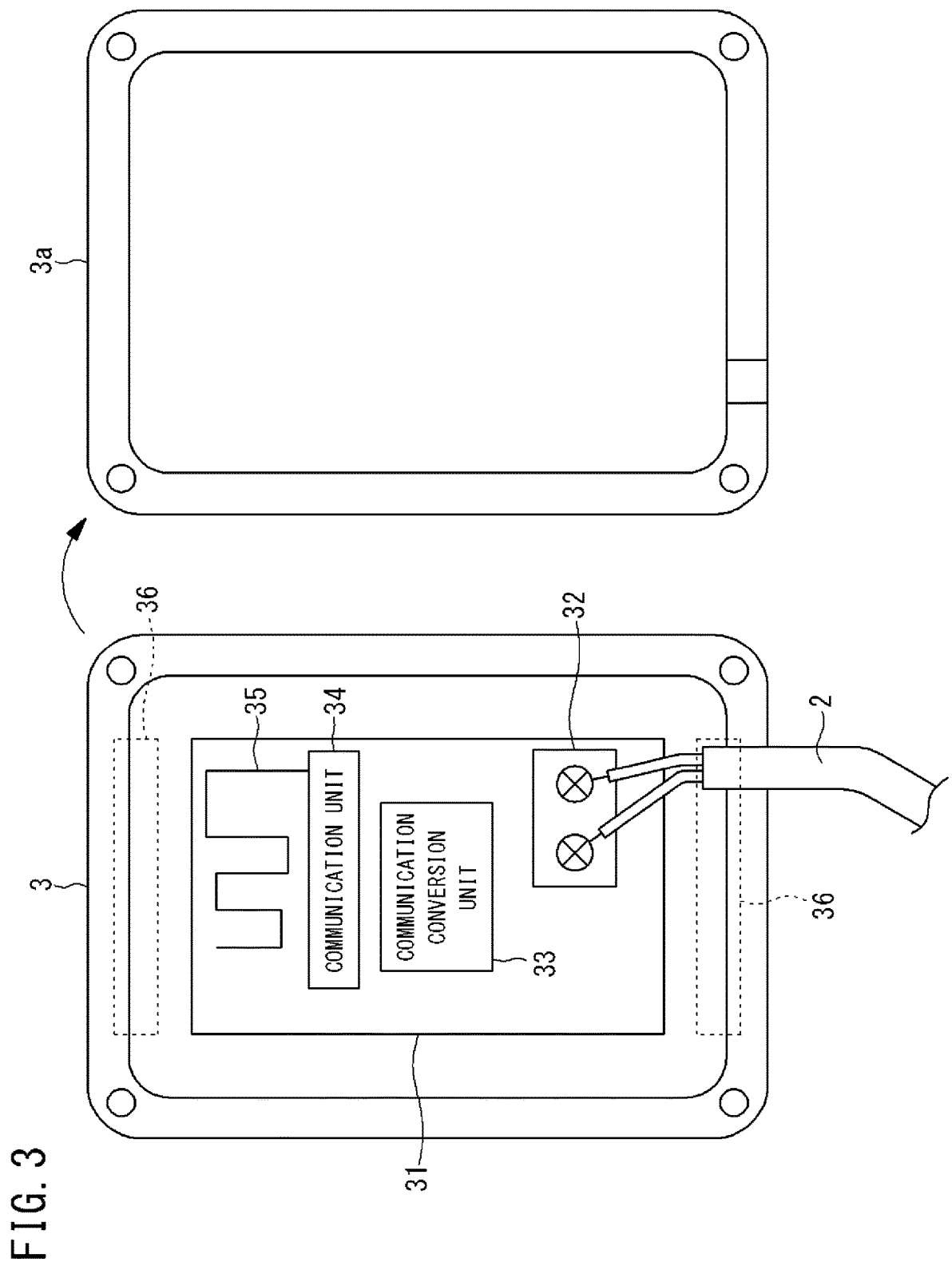
FIG. 3 is a diagram of an exemplary actual configuration of an antenna unit 3.

FIG. 3 is a diagram of an exemplary actual configuration of the antenna unit 3. As illustrated in FIG. 3, the antenna unit 3 includes a main body (the left side in FIG. 3) and a cover 3a (the right side in FIG. 3). FIG. 3 illustrates the antenna unit 3 from which the cover 3a is removed. The main body (the left side in FIG. 3) includes a substrate 31 as well as terminal blocks 32, the communication conversion unit 33, a communication unit 34, and an antenna 35 each mounted on the substrate 31. The two wires of the cable 2 are respectively connected to the terminal blocks 32. A coaxial cable requires at its end a dedicated connector such as an F-type plug. However, the vinyl cabtyre cable requires no dedicated connector, and therefore enables a simple connection as illustrated in FIG. 3.

The cover 3a is placed on the main body, and is fastened to the main body with screws and waterproof O-rings (not illustrated) at the four corners. The antenna unit 3 is thus resistant to water and is suitable for outdoor use. The antenna unit 3 may be fixed with, for example, screws. Alternatively, the antenna unit 3 may have, on its back side, magnets 36. With this configuration, the antenna unit 3 is easily attached to the housing 11, which is made of a metal such as iron, of the air conditioner 1 and other portions made of iron, without thread cutting.

SUMMARY OF THE DISCLOSURE

For example, the disclosure may be summarized and represented as follows. However, the following representations are merely illustrative and not restrictive.

The present disclosure provides a communication system for an air conditioner 1 including a housing 11 and a control board 12 accommodated in the housing 11. The communication system includes a communication conversion unit 13 accommodated in the housing 11 and configured to acquire a required electric signal from the control board 12 and to convert the electric signal into a digital signal for wire transmission. The communication system also includes a cable 2 having a first end connected to the communication conversion unit 13, the cable 2 being drawn out of the housing 11 to outside. The communication system also includes an antenna unit 3 connected to a second end of the cable 2 located outside the housing 11, the antenna unit 3 being configured to establish wireless communication with a base station 4.

The present disclosure also provides an air conditioner 1 including: a housing 11; a control board 12 accommodated in the housing 11; a communication conversion unit 13 accommodated in the housing 11 and configured to acquire a required electric signal from the control board 12 and to convert the electric signal into a digital signal for wire transmission; a cable 2 having a first end connected to the communication conversion unit 13, the cable 2 being drawn out of the housing 11 to outside; and an antenna unit 3 connected to a second end of the cable 2 located outside the housing 11, the antenna unit 3 being configured to establish wireless communication with a base station 4.

In the communication system for the air conditioner and the air conditioner, the position of the antenna unit 3 is not limited to the interior of the housing 11 of the air conditioner 1. With this configuration, the antenna unit 3 is freely installed at a desired position suitable for communication, using the cable 2. This configuration thus causes no communication trouble even when the housing is made of a metal. The cable 2 is an antenna line configured to carry a digital signal for wire transmission rather than a signal for wireless transmission, and is therefore less susceptible to an influence of surge noise. In the communication system, the antenna unit 3 is installed at a higher degree of freedom. The communication system is therefore easy to install, and establishes communication without any trouble. This configuration accordingly allows the antenna unit 3 to be retrofitted to an existing air conditioner with ease.

For example, communication between the antenna unit 3 and the base station 4 is established by a LPWA communication method (e.g., SIGFOX), and communication using the cable 2 is established by a digital communication method (e.g., AMI) different from the LPWA communication method.

Adopting the LPWA communication method such as SIGFOX enables long-range communication between the antenna unit and the base station with reduced power consumption and at reduced cost. The communication using the cable is established by AMI which is an encoded digital communication method less susceptible to an influence of surge noise. This configuration therefore suppresses an influence of surge noise.

Preferably, the communication conversion unit 13 is disposed in proximity to the control board 12 in the housing 11.

With this configuration, reducing the distance between the communication conversion unit 13 and the control board 12 enables suppression of surge noise. In addition, a control power voltage is gained from the control board 12 using a shorter connecting wire.

For example, the antenna unit 3 includes a communication conversion unit 33 configured to convert the digital signal into a communication signal for the LPWA communication method.

With this configuration, the communication conversion unit 33 generates the communication signal for the LPWA communication method, in the immediate vicinity of an antenna 35. This configuration therefore suppresses an influence of surge noise more effectively.

For example, the digital signal is a signal superimposed on a power voltage for the antenna unit 3.

This configuration eliminates a necessity of a power supply dedicated to the antenna unit 3.

For example, the cable 2 is a two-wire vinyl cabtyre cable.

A two-wire vinyl cabtyre cable is available with ease, and requires no dedicated connector at its end. In addition, the two-wire vinyl cabtyre cable is inexpensive as a whole, and is excellent in weather resistance.

For example, the antenna unit 3 includes a magnet 36 for magnetic adsorption.

With this configuration, the antenna unit 3 is fixable to any position of an iron plate with ease at a place where the antenna unit 3 is capable of wireless communication with the base station 4. For example, the antenna unit 3 may be fixed to an outer surface of the housing 11 of the air conditioner 1 (i.e., the outdoor unit). This configuration therefore requires no construction such as boring, and also requires no waterproof treatment associated with boring. This configuration thus enables rapid installation of the communication system.

<<Others>>

The disclosure describes the LPWA communication method. However, the communication method is not limited to the LPWA communication method. Other communication methods may be applicable now or in the future. The disclosure also describes SIGFOX as a specific example of the LPWA communication method. However, a specific example of the LPWA communication method is not limited to SIGFOX. Specific examples of the LPWA communication method may include, but not limited to, LORA (registered trademark) and NB-IoT.

In addition, the communication using the cable 2 is not limited to AMI. The disclosure does not intend to exclude other digital communication methods.

While various embodiments have been described herein above, it is to be appreciated that various changes in form and detail may be made without departing from the spirit and scope presently or hereafter claimed.

REFERENCE SIGNS LIST

1: AIR CONDITIONER (OUTDOOR UNIT)
2: CABLE
3: ANTENNA UNIT
3a: COVER
4: BASE STATION
5: INTERNET
6: SERVER
11: HOUSING
12: CONTROL BOARD
13: COMMUNICATION CONVERSION UNIT
14: ELECTRIC CIRCUIT
31: SUBSTRATE
32: TERMINAL BLOCK
33: COMMUNICATION CONVERSION UNIT
34: COMMUNICATION UNIT
35: ANTENNA
36: MAGNET

The invention claimed is:

1. A communication system for an air conditioner, the communication system comprising:
a control board accommodated in a housing of an outdoor unit of the air conditioner;
a first communication conversion unit accommodated in the housing and configured to acquire a required electric signal from the control board and to convert the electric signal into a digital signal for wire transmission;
a cable having a first end connected to the first communication conversion unit, the cable being drawn out of the housing to outside with a second end of the cable extending to an outdoor place suitable for communication with a base station; and
an antenna unit connected to the second end of the cable located outside the housing, the antenna unit including a second communication conversion unit which converts the digital signal to a signal for wireless communication and being configured to establish wireless communication with the base station,
wherein the antenna unit includes a magnet for magnetic adsorption,
and
the antenna unit is installed, with the magnet, at the outdoor place.

2. The communication system according to claim 1, wherein
communication between the antenna unit and the base station is established by a low power wide area (LPWA) communication method, and
communication using the cable is established by a digital communication method different from the LPWA communication method.

3. The communication system according to claim 2, wherein
the second communication conversion unit configured to convert the digital signal into a communication signal for the LPWA communication method.

4. The communication system according to claim 3, wherein
the digital signal is a signal superimposed on a power voltage for the antenna unit.

5. The communication system according to claim 2, wherein
the communication conversion unit is disposed in proximity to the control board in the housing.

6. The communication system according to claim 2, wherein
the digital signal is a signal superimposed on a power voltage for the antenna unit.

7. The communication system according to claim 1, wherein
the first communication conversion unit is disposed in proximity to the control board in the housing.

8. The communication system according to claim 7, wherein
the digital signal is a signal superimposed on a power voltage for the antenna unit.

9. The communication system according to claim 1, wherein
the digital signal is a signal superimposed on a power voltage for the antenna unit.

10. The communication system according to claim 1, wherein
the cable is a two-wire vinyl cabtyre cable.

11. An air conditioner comprising:
a housing of an outdoor unit of an air conditioner;
a control board accommodated in the housing;
a first communication conversion unit accommodated in the housing and configured to acquire a required electric signal from the control board and to convert the electric signal into a digital signal for wire transmission;
a cable having a first end connected to the first communication conversion unit,
the cable being drawn out of the housing to outside with a second end of the cable extending to an outdoor place suitable for communication with a base station; and
an antenna unit connected to the second end of the cable located outside the housing,
the antenna unit including a second communication conversion unit which converts the digital signal to a signal for wireless communication and being configured to establish wireless communication with the base station, wherein the antenna unit includes a magnet for magnetic adsorption, and the antenna unit is installed, with the magnet, at the outdoor place.

\* \* \* \* \*